United States Patent
Li et al.

(10) Patent No.: US 11,430,150 B2
(45) Date of Patent: Aug. 30, 2022

(54) METHOD AND APPARATUS FOR PROCESSING SPARSE POINTS

(71) Applicant: SAMSUNG ELECTRONICS CO., LTD., Suwon-si (KR)

(72) Inventors: Zhuo Li, Xi'an (CN); Huiguang Yang, Xi'an (CN); Yuguang Li, Xi'an (CN); Liu Yang, Xi'an (CN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/123,540

(22) Filed: Dec. 16, 2020

(65) Prior Publication Data

US 2021/0209798 A1    Jul. 8, 2021

(30) Foreign Application Priority Data

Jan. 3, 2020 (CN) .......................... 202010006265.8
Nov. 11, 2020 (KR) .......................... 10-2020-0150499

(51) Int. Cl.
*G06T 7/73* (2017.01)
*G06T 7/77* (2017.01)

(52) U.S. Cl.
CPC .............. *G06T 7/73* (2017.01); *G06T 7/77* (2017.01); *G06T 2207/20084* (2013.01)

(58) Field of Classification Search
CPC ... G06T 7/73; G06T 7/77; G06T 2207/20084; G06T 2207/10028; G06N 3/02–088
See application file for complete search history.

(56) References Cited

U.S. PATENT DOCUMENTS

| | | | |
|---|---|---|---|
| 9,060,714 | B2 | 6/2015 | Bajesy et al. |
| 2017/0124693 | A1 | 5/2017 | Ramalingam et al. |
| 2018/0137647 | A1 | 5/2018 | Li et al. |
| 2018/0174323 | A1 | 6/2018 | Ji et al. |
| 2019/0086546 | A1 | 3/2019 | Tsishkou et al. |
| 2021/0124901 | A1* | 4/2021 | Liu ..................... G06K 9/0063 |

FOREIGN PATENT DOCUMENTS

| | | |
|---|---|---|
| CN | 104835153 A | 8/2015 |
| CN | 106445138 A | 2/2017 |
| CN | 107239754 A | 10/2017 |

(Continued)

OTHER PUBLICATIONS

Wang, Yue, et al. "Dynamic graph cnn for learning on point clouds." Acm Transactions on Graphics (tog) 38.5 (2019): 1-12. (Year: 2019).*

(Continued)

*Primary Examiner* — Geoffrey E Summers
(74) *Attorney, Agent, or Firm* — NSIP Law

(57) ABSTRACT

A method and apparatus for processing sparse points. The method includes determining spatial hierarchical point data based on a key point set and a local point set of a sparse point set, determining relationship feature data by encoding a spatial hierarchical relationship between points of the spatial hierarchical point data, generating a global feature and a local feature of the sparse point set through a conversion operation associated with the relationship feature data, and generating a processing result for the sparse point set based on the global feature and the local feature.

14 Claims, 10 Drawing Sheets

(56) References Cited

FOREIGN PATENT DOCUMENTS

| CN | 109800725 A | 5/2019 |
|---|---|---|
| CN | 109816050 A | 5/2019 |
| KR | 10-2019-0087258 A | 7/2019 |

OTHER PUBLICATIONS

Dorodnicov, Sergey. "The Basics of Stereo Depth Vision." Jul. 17, 2018, Intel, https://www.intelrealsense.com/stereo-depth-vision-basics/ (Year: 2018).*

Wang, Yue, and Justin M. Solomon. "Deep Closest Point: Learning Representations for Point Cloud Registration." arXiv preprint arXiv:1905.03304v1 (2019). (Year: 2019).*

Chen, Xinghao, et al. "Shpr-net: Deep semantic hand pose regression from point clouds." IEEE Access 6 (2018): 43425-43439. (Year: 2018).*

Nezhadarya, Ehsan, Yang Liu, and Bingbing Liu. "BoxNet: A Deep Learning Method for 2D Bounding Box Estimation from Bird's-Eye View Point Cloud." 2019 IEEE Intelligent Vehicles Symposium (IV). IEEE, 2019. (Year: 2019).*

Charles, R. Qi, et al. "PointNet: Deep Learning on Point Sets for 3D Classification and Segmentation." 2017 IEEE Conference on Computer Vision and Pattern Recognition (CVPR). IEEE, 2017. (Year: 2017).*

Yuan, Wentao, et al. "Iterative transformer network for 3d point cloud." arXiv preprint arXiv:1811.11209v2 (2019). (Year: 2019).*

\* cited by examiner

METHOD AND APPARATUS FOR PROCESSING SPARSE POINTS

CROSS-REFERENCE TO RELATED APPLICATIONS

This application claims the benefit under 35 USC 119(a) of Chinese Patent Application No. 202010006265.8, filed on Jan. 3, 2020, in the China National Intellectual Property Administration and Korean Patent Application No. 10-2020-0150499, filed on Nov. 11, 2020, in the Korean Intellectual Property Office, the entire disclosures of which are incorporated herein by reference for all purposes.

BACKGROUND

1. Field

The following description relates to a method and apparatus for processing sparse points.

2. Description of Related Art

An existing process of processing a point set, for example, two-dimensional (2D) pixel points to estimate a pose of a target is very complex. Such a process includes feature extraction, 2D and three-dimensional (3D) registration, geometric transformation, or nonlinear optimization. The process requires a large amount of computing resources, and causes a relatively large amount of noise. Methods to solve such issues based on deep learning are gradually increasing. For example, a method of estimating a pose of a target by processing an image through a convolutional neural network (CNN) may be used, and is more robust than existing methods. However, the method is mainly suitable for a dense pixel point set and is used to extract texture and contour features from an image. Accordingly, it is impossible to apply the method to an unordered point set, in particular, a sparse point set that has no texture, contour and color.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of processing sparse points includes determining spatial hierarchical point data based on a key point set and a local point set of a sparse point set, determining relationship feature data of the spatial hierarchical point data by encoding a spatial hierarchical relationship between points of the spatial hierarchical point data, generating a global feature and a local feature of the sparse point set through a conversion operation associated with the relationship feature data, and generating a processing result for the sparse point set based on the global feature and the local feature.

The determining of the spatial hierarchical point data may include determining the key point set by sampling key points in the sparse point set, and determining the local point set by grouping local points around each of the key points.

The determining of the relationship feature data may include determining a spatial hierarchical relationship representation of the spatial hierarchical point data, and determining the relationship feature data by applying the spatial hierarchical relationship representation to the spatial hierarchical point data. The determining of the spatial hierarchical relationship representation may include determining first intermediate data by transforming the spatial hierarchical point data based on the key point set, determining second intermediate data by transforming the spatial hierarchical point data based on the local point set, and determining the spatial hierarchical relationship representation by summing the first intermediate data and second intermediate data.

The generating of the global feature and the local feature may include generating the global feature through a max pooling operation based on the relationship feature data, and generating the local feature through a concatenation operation based on the relationship feature data.

The sparse point set may be generated based on a change in visual information sensed by a dynamic vision sensor (DVS). The processing result may include a pose estimation result of a target corresponding to the sparse point set. The pose estimation result may indicate a pose of the target by six degrees of freedom (6DOF). The processing result may include identification information of each point of the sparse point set. The sparse point set may be a sparse two-dimensional (2D) point set that is free of texture, contour and color.

In another general aspect, an apparatus for processing sparse points includes a processor and a memory including instructions executable by the processor, wherein in response to the instructions being executed by the processor, the processor is configured to determine spatial hierarchical point data based on a key point set and a local point set of a sparse point set, to determine relationship feature data of the spatial hierarchical point data by encoding a spatial hierarchical relationship between points of the spatial hierarchical point data, to generate a global feature and a local feature of the sparse point set through a conversion operation associated with the relationship feature data, and to generate a processing result for the sparse point set based on the global feature and the local feature.

In another general aspect, an electronic apparatus includes a DVS configured to generate an event stream for a sparse point set based on a change in sensed visual information, and a processor configured to determine spatial hierarchical point data based on a key point set and a local point set of the sparse point set, to determine relationship feature data of the spatial hierarchical point data by encoding a spatial hierarchical relationship between points of the spatial hierarchical point data, to generate a global feature and a local feature of the sparse point set through a conversion operation associated with the relationship feature data, and to generate a processing result for the sparse point set based on the global feature and the local feature.

Other features and aspects will be apparent from the following detailed description, the drawings, and the claims.

Figure 1:
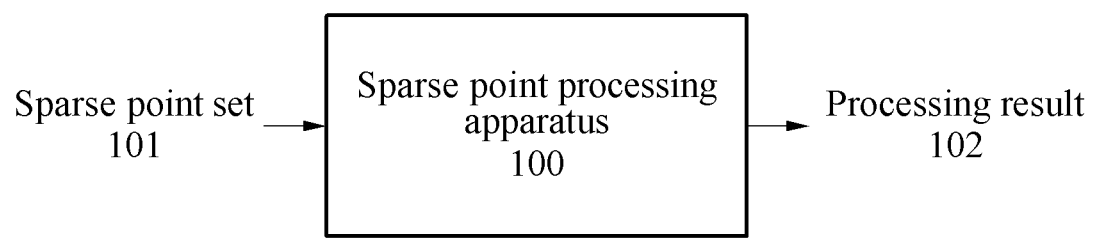
FIG. 1 schematically illustrates an example of an operation of an apparatus for processing sparse points.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout.

FIG. 1 schematically illustrates an example of an operation of an apparatus for processing sparse points (hereinafter, referred to as a sparse point processing apparatus). Referring to FIG. 1, a sparse point processing apparatus 100 may process a sparse point set 101 and may output a processing result 102. The sparse point set 101 may be a sparse two-dimensional (2D) point set that is unordered and that has no texture, contour and color.

In an example, the sparse point set 101 may be generated based on a change in visual information sensed by a dynamic vision sensor (DVS). For example, the DVS may sense a change in visual information based on movement or flicker of a light source, for example, a light emitting diode (LED), and may generate sensor information (for example, an event stream associated with the sparse point set 101) corresponding to the sensed change. The sparse point set 101 may include the sensor information, in particular, information of each point included in an image specified by a sparse event stream. For example, the sparse point set 101 may be represented as $\{x_n' | n' = 1, 2, 3, \ldots, n\}$. In this example, point $x_n'$ may correspond to 2D pixel coordinates (u, v), and $x_n' \in \mathbb{R}^2$ may be established for the point $x_n'$. Also, an additional feature channel may be added to each point $x_n'$.

The processing result 102 may include a pose estimation result of a target corresponding to the sparse point set 101. In an example, the target may be a hand controller including a plurality of LEDs, and the sparse point set 101 may represent light emission states of the LEDs. A pose of the hand controller may change based on movement of a hand of a user, and the sparse point processing apparatus 100 may estimate the pose of the hand controller based on the sparse point set 101. The hand controller may correspond to, for example, a game controller or a virtual reality (VR) controller. In another example, the sparse point processing apparatus 100 may be mounted in an autonomous vehicle, and the target may be various obstacles (for example, other vehicles, streetlights or signs) in the vicinity of the autonomous vehicle. The sparse point processing apparatus 100 may estimate poses of obstacles in the vicinity of the autonomous vehicle based on the sparse point set 101. A pose estimation result may be represented by six degrees of freedom (6DOF). For example, the pose estimation result may be represented by a seven-dimensional (7D) vector (tx, ty, tz, qw, qx, qy, qz) including translation information of three degrees of freedom (3DOF) and rotation information of 3DOF.

Also, the processing result 102 may include identification information of each point of the sparse point set 101, and accordingly segmentation of the sparse point set 101 may be performed. In an example, when the sparse point set 101 corresponds to LEDs of a hand controller, the identification information may indicate which LED of the hand controller corresponds to each point of the sparse point set 101. In another example, when the sparse point set 101 corresponds to obstacles in the vicinity of an autonomous vehicle, the identification information may be used to identify obstacles (for example, other vehicles, streetlights or signs) in the vicinity of the autonomous vehicle. In addition, the sparse point processing apparatus 100 may have a relatively high universality in a task associated with the sparse point set 101.

The sparse point processing apparatus 100 may process the sparse point set 101 using a deep learning-based neural network. The sparse point processing apparatus 100 may employ a two-stage subnetwork scheme, to perform relationship feature coding of a key point set and relationship feature coding of a local point set through each stage, to extract a global feature and a local feature of a sparse point set, and to obtain a complete point set feature mapping. Since translation of a camera or an object is greatly affected by global features of the sparse point set 101, whereas rotation of an object is greatly affected by local features, in particular, a relationship feature between points, of an input sparse point set, two-stage networks may extract global features and local features of a sparse point set, respectively, and may fuse the global features and the local features, to enhance an accuracy of the processing result 102.

The sparse point processing apparatus 100 may encode spatial hierarchical relationship features between points of a sparse 2D point set, or an extremely sparse 2D point set, and may obtain more accurate depth features (global features and/or local features). The above scheme may be used to simultaneously perform the relationship feature coding of the key point set and the relationship feature coding of the local point set. In practice, unlike a dense pixel image for which a convolutional neural network (CNN) is mainly used for feature extraction, the sparse point set 101 has no clear texture and contour features. Thus, in the sparse point set 101, relationship features (for example, a spatial position relationship) between points may be most important. In the sparse point set 101, in particular, an extremely sparse point set, relationship features between points may be extremely useful for processing a task, and accordingly the sparse point processing apparatus 100 may extract global features and/or local features through encoding of the spatial hierarchical relationship, to enhance an effect of a final task.

In an example, the sparse point processing apparatus 100 may perform relationship feature coding for each of the key point set and the local point set, and may obtain a relationship feature code of the key point set and a relationship feature code of the local point set. The sparse point processing apparatus 100 may perform relationship feature coding between points of the key point set using a non-local coding scheme, and may perform relationship feature coding between points of the local point set using the non-local coding scheme. Also, the sparse point processing apparatus 100 may extract the global feature and the local feature of the sparse point set 101 based on the relationship feature code of the key point set and the relationship feature code of the local point set, respectively.

In an example, the sparse point processing apparatus 100 may restore the spatial hierarchical point data in a form of the sparse point set 101 using a reconstruction strategy for each interpolation layer based on the global feature and the local feature, and may determine a marker corresponding to each event stream among the spatial hierarchical point data in the form of the sparse point set 101 using a multilayer perceptron (MLP). Thus, an accuracy of segmentation of a point set may be enhanced.

Figure 2:
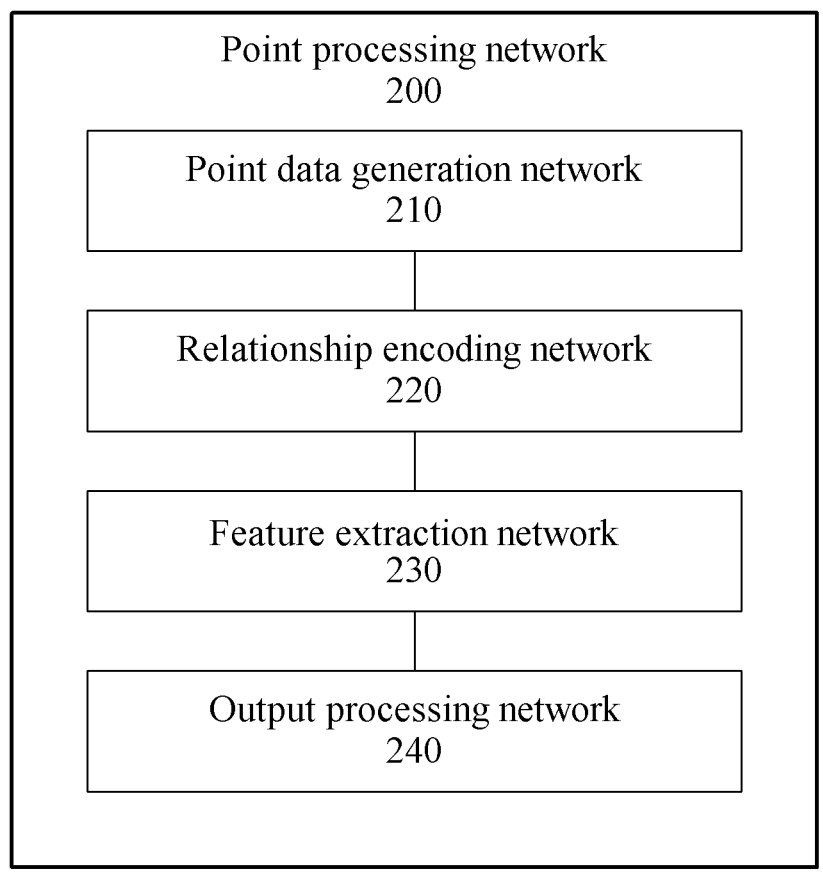
FIG. 2 illustrates an example of a configuration of a point processing network.

FIG. 2 illustrates an example of a configuration of a point processing network 200. The point processing network 200 may correspond to a deep learning-based neural network model, and the sparse point processing apparatus 100 of FIG. 1 may process a sparse point set using the point processing network 200. Referring to FIG. 2, the point processing network 200 includes a point data generation network 210, a relationship encoding network 220, a feature extraction network 230, and an output processing network 240. A process of processing the sparse point set will be described below based on an operation of each of the above subnetworks. However, an operation that will be described below may be construed as an operation of the point processing network 200 and an operation of the sparse point processing apparatus 100.

The point data generation network 210 may determine spatial hierarchical point data, hereinafter, referred to as "point data", based on a key point set and a local point set of the sparse point set. For example, the point data generation network 210 may determine the key point set by sampling key points in the sparse point set, and may determine the local point set by grouping local points around each of the key points. Accordingly, the point data generation network 210 may allow the point data to include as much point information of an input point set as possible. For example, the point data generation network 210 may use farthest point sampling (FPS) to increase the overall coverage effect of sampling points.

The point data generation network 210 may determine a key point set including "K" key points, may collect a local point set including "M" local points around each of the "K" key points of the key point set, and may obtain point data with a spatial hierarchical structure of the key point set and the local point set. The point data may include a one-to-one correspondence relationship between each key point of the key point set and a local subpoint set of the local point set. Accordingly, the point data may include "K×M" point sets (including key point sets and local point sets) in total.

The relationship encoding network 220 may determine relationship feature data of the spatial hierarchical point data by encoding a spatial hierarchical relationship between points of the spatial hierarchical point data. As described above, a relationship feature between points may be most important in the sparse point set. The relationship encoding network 220 may use an encoding scheme that may reflect the above relationship feature, to determine the relationship feature data of the spatial hierarchical point data. For example, the relationship encoding network 220 may determine first intermediate data by transforming the spatial hierarchical point data based on the key point set, may determine second intermediate data by transforming the spatial hierarchical point data based on the local point set, and may determine a spatial hierarchical relationship representation by summing the first intermediate data and the second intermediate data. The relationship encoding network 220 may apply the spatial hierarchical relationship representation to the spatial hierarchical point data, and may determine the relationship feature data of the spatial hierarchical point data. Examples of a structure and an operation of the relationship encoding network 220 will be further described below.

The feature extraction network 230 may generate a global feature and a local feature of the sparse point set through a conversion operation associated with the relationship feature data. For example, the feature extraction network 230 may generate the global feature through a max pooling operation based on the relationship feature data, and may generate the local feature through a concatenation operation based on the relationship feature data. For example, the relationship feature data may be generated through a plurality of encoding operations, and the feature extraction network 230 may generate the global feature by applying max pooling to an output of a final operation, and may generate the local feature by concatenating the output of the final operation and outputs of several operations prior to the final operation. Subsequently, the feature extraction network 230 may generate the global feature and the local feature by scaling a result of the max pooling and a result of the concatenating to an appropriate size. Examples of a structure and an operation of the feature extraction network 230 will be further described below.

The output processing network 240 may generate a processing result for the sparse point set based on the global feature and the local feature. The output processing network 240 may concatenate the global feature and the local feature that are adjusted to have the same size through scaling, and may generate the processing result based on an integrated feature. For example, the output processing network 240 may process the integrated feature using any one or any combination of a subnetwork and various layers, for example, an MLP, pooling (for example, max pooling), a fully-connected network (FCN), or a softmax. The processing result may include, for example, identification information and pose information (for example, 6DOF) of the sparse point set.

Figure 3:
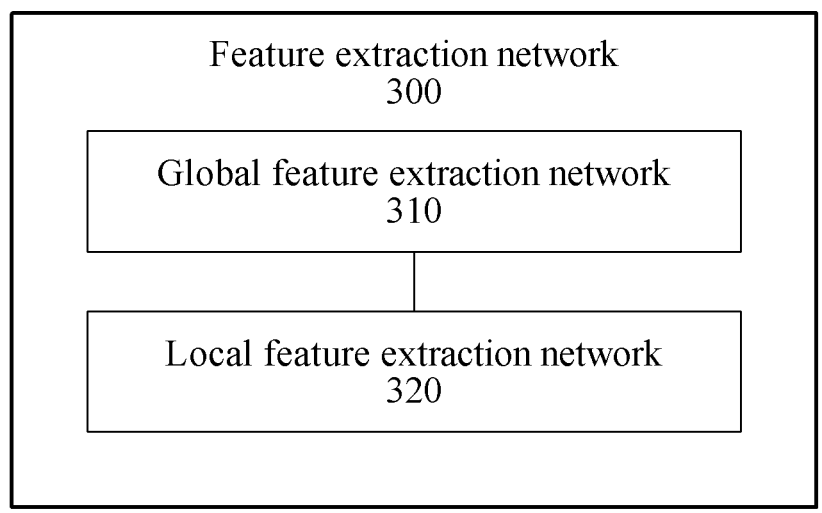
FIG. 3 illustrates an example of a configuration of a feature extraction network.

FIG. 3 illustrates an example of a configuration of a feature extraction network 300. Referring to FIG. 3, the feature extraction network 300 may include a global feature extraction network 310 and a local feature extraction network 320. A global feature may indicate global mapping of a point set, and a local feature may indicate fine mapping of the point set. As described above, a sparse point processing apparatus may employ a two-stage subnetwork scheme of the global feature extraction network 310 and the local feature extraction network 320, to perform relationship feature coding of a key point set and relationship feature coding of a local point set through each stage, to extract a global feature and a local feature of a sparse point set, and to obtain a complete point set feature mapping.

Figure 4:
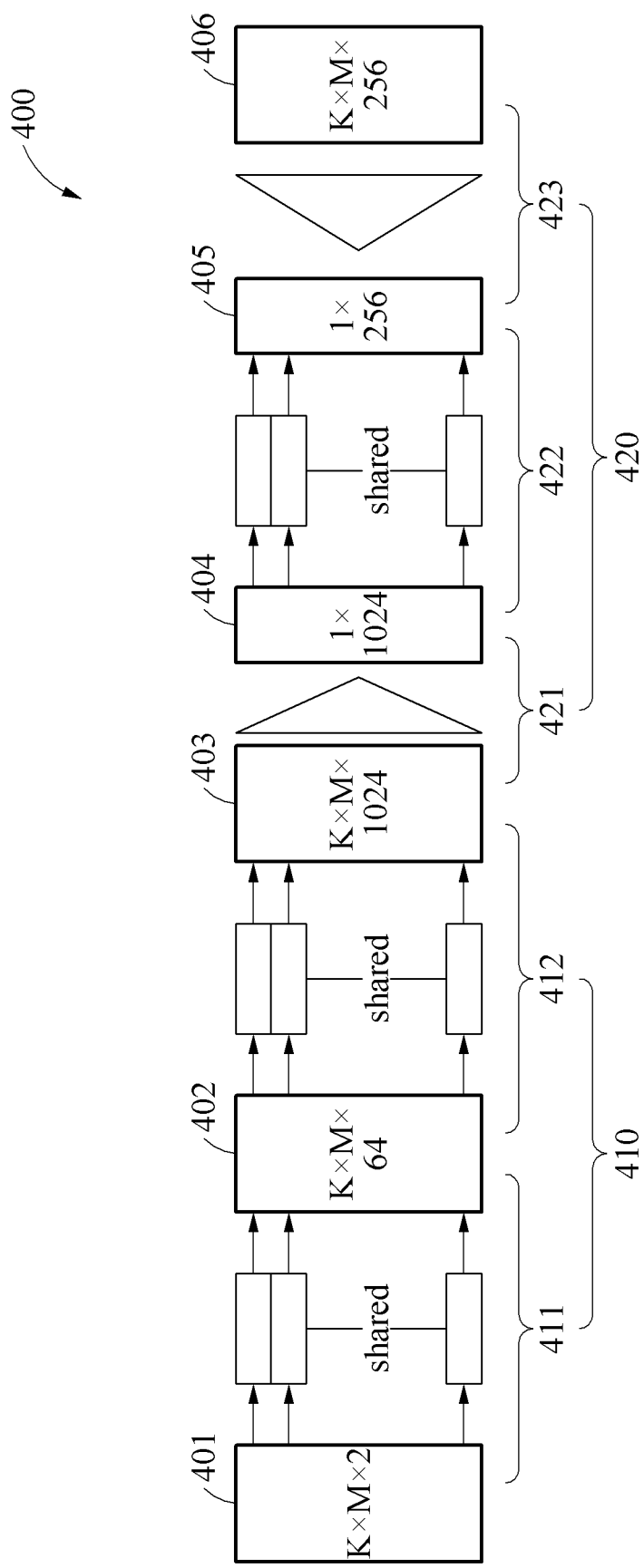
FIG. 4 illustrates an example of a structure of a global feature generation network.

FIG. 4 illustrates an example of a structure of a global feature generation network 400. Referring to FIG. 4, the global feature generation network 400 may include a relationship encoding network 410 and a global feature extraction network 420. The relationship encoding network 410 may determine relationship feature data 403 based on spatial hierarchical point data 401. The global feature extraction network 420 may generate a global feature 406 based on the relationship feature data 403.

The relationship encoding network 410 may include a first subnetwork 411 and a second subnetwork 412. The first subnetwork 411 and the second subnetwork 412 may respectively correspond to multiple non-local-encoders. The multiple non-local-encoders may encode a spatial hierarchical relationship of input data, and examples of structures and operations thereof will be further described below. The first subnetwork 411 may encode a spatial hierarchical relationship of the point data 401, and may determine relationship feature data 402. The second subnetwork 412 may encode a spatial hierarchical relationship of the relationship feature data 402, and may determine the relationship feature data 403.

The point data 401 may have a dimension of "K×M×2", the relationship feature data 402 may have a dimension of "K×M×64" and the relationship feature data 403 may have a dimension of "K×M×1024". K denotes a number of key points, and M denotes a number of neighboring local points matching each key point. For example, the first subnetwork 411 may include an MLP with 64×64 elements, and the second subnetwork 412 may include an MLP with 64×128×1024 elements. In this example, a number of elements in parentheses indicates a number of layers in the MLP, and each value indicates a neuron size of each layer. In other words, a dimension of an increasing channel direction may increase to, for example, "2", "64" and "1024", through the relationship encoding network 410. A number of channels, for example, "2", "64", or "1024", is merely an example, and may have various other values. Although the relationship encoding network 410 includes two subnetworks, that is, the first subnetwork 411 and the second subnetwork 412 as described above, the relationship encoding network 410 may include a single subnetwork or three or more subnetworks.

The global feature extraction network 420 may include a pooling layer 421, an MLP 422, and a scaling layer 423. The pooling layer 421 may generate first intermediate data 404 by performing a pooling operation (for example, a max pooling operation) associated with the relationship feature data 403. When the first intermediate data 404 passes through the MLP 422, second intermediate data 405 may be generated, and the scaling layer 423 may generate the global feature 406 through scaling (for example, tile) of the second intermediate data 405. For example, a dimension of data may be reduced from "K×M×1024" to "1×1024" through the pooling layer 421, and may be further reduced to "1×256" through the MLP 422. For example, the MLP 422 may have a structure of (512, 256, 256). Also, through the scaling, the dimension of "1×256" may increase to "K×M×256". However, the above numbers indicating the dimension of data is merely an example, and each dimension may be a different value. The first subnetwork 411, the second subnetwork 412 and the MLP 422 may share parameters.

Figure 5:
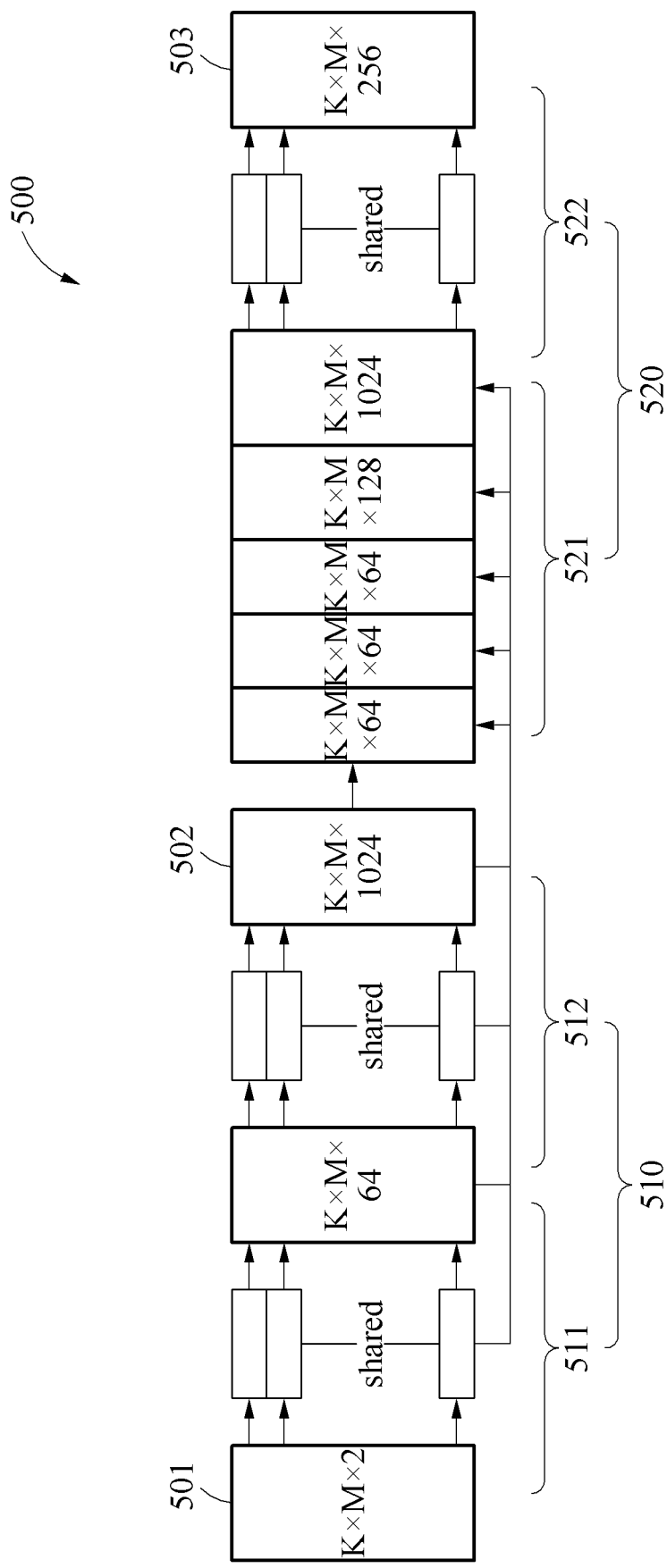
FIG. 5 illustrates an example of a structure of a local feature generation network.

FIG. 5 illustrates an example of a structure of a local feature generation network 500. Referring to FIG. 5, the local feature generation network 500 may include a relationship encoding network 510 and a global feature extraction network 520. The relationship encoding network 510 may determine relationship feature data 502 based on spatial hierarchical point data 501, and the local feature extraction network 520 may determine a local feature 503 based on the relationship feature data 502.

The relationship encoding network 510 may include a first subnetwork 511 and a second subnetwork 512. The relationship encoding network 510 may correspond to the relationship encoding network 410 of FIG. 4. In an example, the local feature generation network 500 may use the relationship feature data 403 output by the relationship encoding network 410, instead of determining the relationship feature data 502 using the relationship encoding network 510. In another example, the global feature generation network 400 may use the relationship feature data 502 output by the relationship encoding network 510. In other words, the global feature generation network 400 and the local feature generation network 500 may share and use one of the relationship encoding networks 410 and 510.

The local feature extraction network 520 may include a concatenation layer 521 and an MLP 522. The concatenation layer 521 may perform a concatenation operation associated with the relationship feature data 502. The relationship feature data 502 may be generated through a plurality of encoding operations, and the concatenation layer 521 may concatenate data of a final operation among the encoding operations and data of several operations prior to the final operation. For example, the first subnetwork 511 may include an MLP with 64×64 elements, and the second subnetwork 512 may include an MLP with 64×128×1024 elements. Relationship feature data of "K×M×64", "K×M× 64", "K×M×64", "K×M×128", and "K×M×1024" may be generated through encoding operations, and at least a portion of the relationship feature data may be concatenated. The MLP 522 may have a structure of (512, 256, 256), and a dimension of data may be changed from "K×M×1024" to "K×M×256" through the MLP 522. Accordingly, a dimension of the local feature 503 may be identical to that of the global feature 406 of FIG. 4. A number indicating the dimension of data, for example, "64", "128", "512", "256", or "1024", is merely an example, and each dimension may have a different value.

Figure 6:
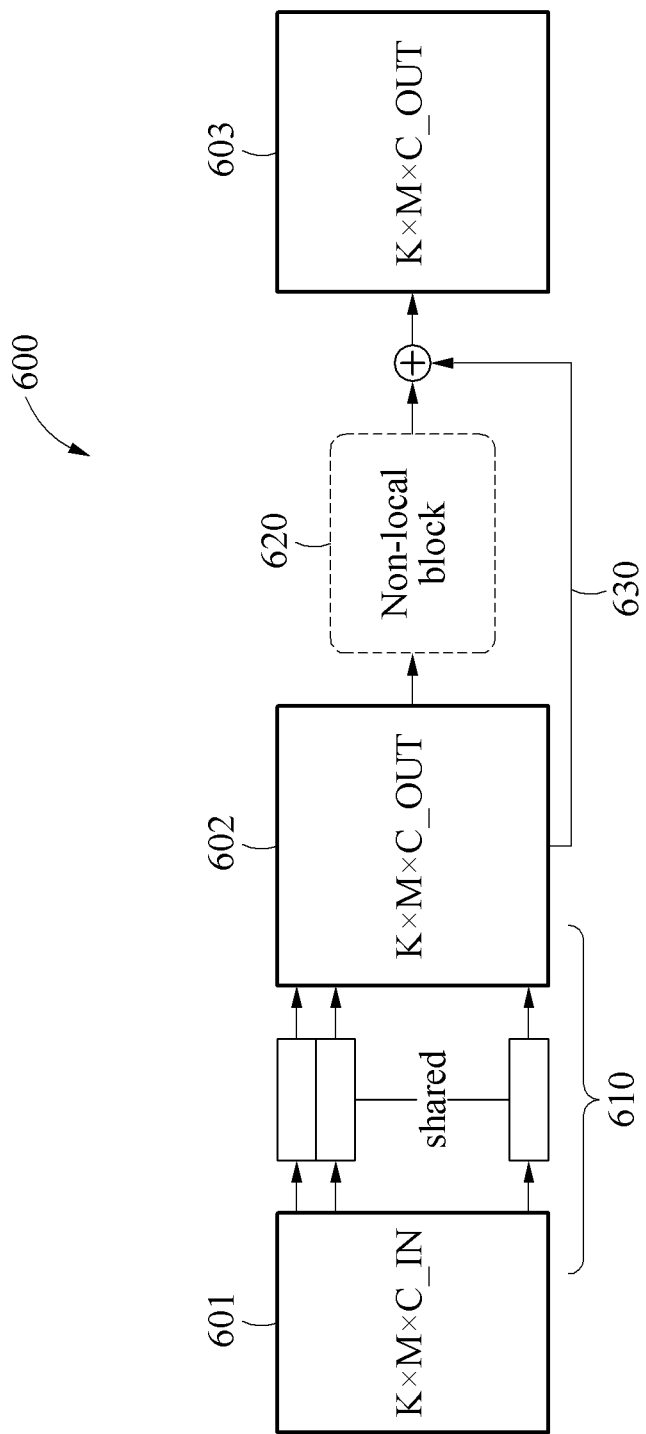
FIG. 6 illustrates an example of a structure of a multi-non-local encoder.

FIG. 6 illustrates an example of a structure of a multi-non-local encoder 600. Referring to FIG. 6, the multi-non-local encoder 600 may include an MLP 610, a non-local block 620, and a skip connection 630. The multi-non-local encoder 600 may share parameters with another network, which may indicate that the MLP 610 of the multi-non-local encoder 600 shares parameters with another network, for example, another MLP. The MLP 610 may output intermediate data 602 in response to an input of input data 601. In this example, a dimension of data may be changed from "K×M×C_IN" to "K×M×C_OUT".

For example, when the multi-non-local encoder 600 is the first subnetwork 411 of the relationship encoding network 410 of FIG. 4, the input data 601 may be the spatial hierarchical point data 401 and output data 603 may be the relationship feature data 402. Also, C_IN may be "2" and C_OUT may be "64". The intermediate data 602 may be input to the non-local block 620, and a spatial hierarchical relationship representation for the input data 601 may be determined. The output data 603 may be determined by applying the spatial hierarchical relationship representation to the input data 601, for example, by summing the intermediate data 602 and the spatial hierarchical relationship representation through the skip connection 630.

Figure 7:
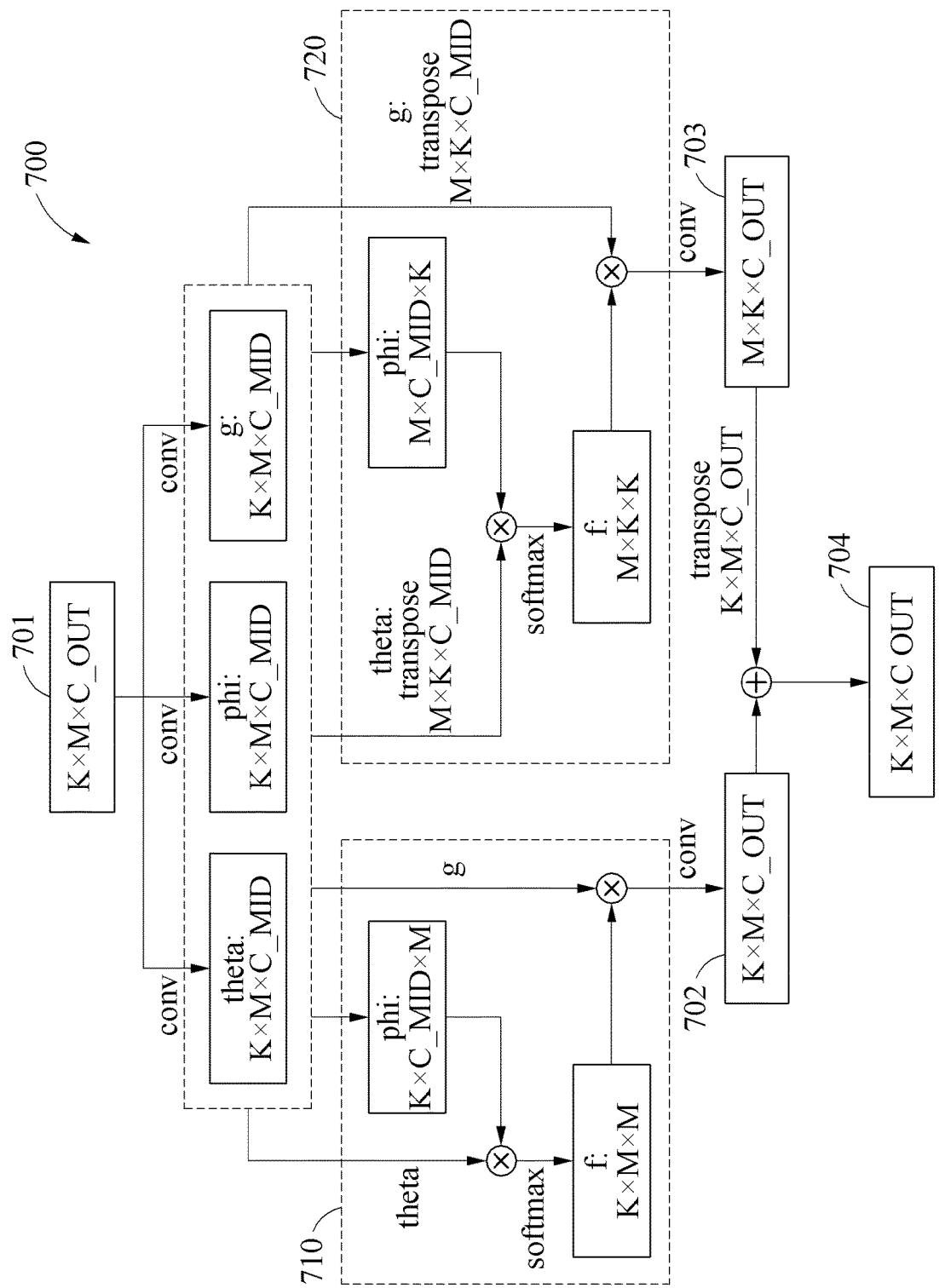
FIG. 7 illustrates an example of a non-local block of an encoding network.

FIG. 7 illustrates an example of a non-local block 700 of an encoding network. Referring to FIG. 7, a spatial hierarchical relationship representation 704 corresponding to spatial hierarchical point data 701 may be generated through the non-local block 700. An operation associated with the non-local block 700 may be performed by a sparse point processing apparatus. The spatial hierarchical point data 701 may correspond to the intermediate data 602 of FIG. 6. The point data 701 may be in various forms, and first intermediate data 702 based on a key point set, for example, K-dimension, and second intermediate data 703 based on a local point set, for example, M-dimension, may be generated through an operation between transformed data. The spatial hierarchical relationship representation 704 may be generated by summing the first intermediate data 702 and the second intermediate data 703.

For example, the point data 701 may be transformed to various forms, for example, theta, phi, or g, through convolution or transpose, and an operation between transformed data in various forms may be performed. C_MID may be a temporary value used in the non-local block 700 and may be different from C_OUT. For example, in an operation block 710, phi may be transformed to "K×C_MID×M", and f may be calculated by a multiplication operation between theta and the transformed phi. In this example, f may have a dimension of "K×M×M", and softmax may be used in a process of deriving f. As a result of the operation block 710, the first intermediate data 702 may be derived.

Similarly, in an operation block 720, theta may be transposed to "M×K×C_MID", phi may be transformed to "M×C_MID×K", and f may be calculated by a multiplication operation between the transposed theta and the transformed phi. In this example, f may have a dimension of "M×K×K", and softmax may be used in a process of deriving f. Also, g may be transposed to "M×K×C_MID", and a multiplication operation between f and the transposed g may be performed. As a result of the operation block 720, the second intermediate data 703 may be derived. The second intermediate data 703 may be transposed to be added to the first intermediate data 702.

Figure 8:
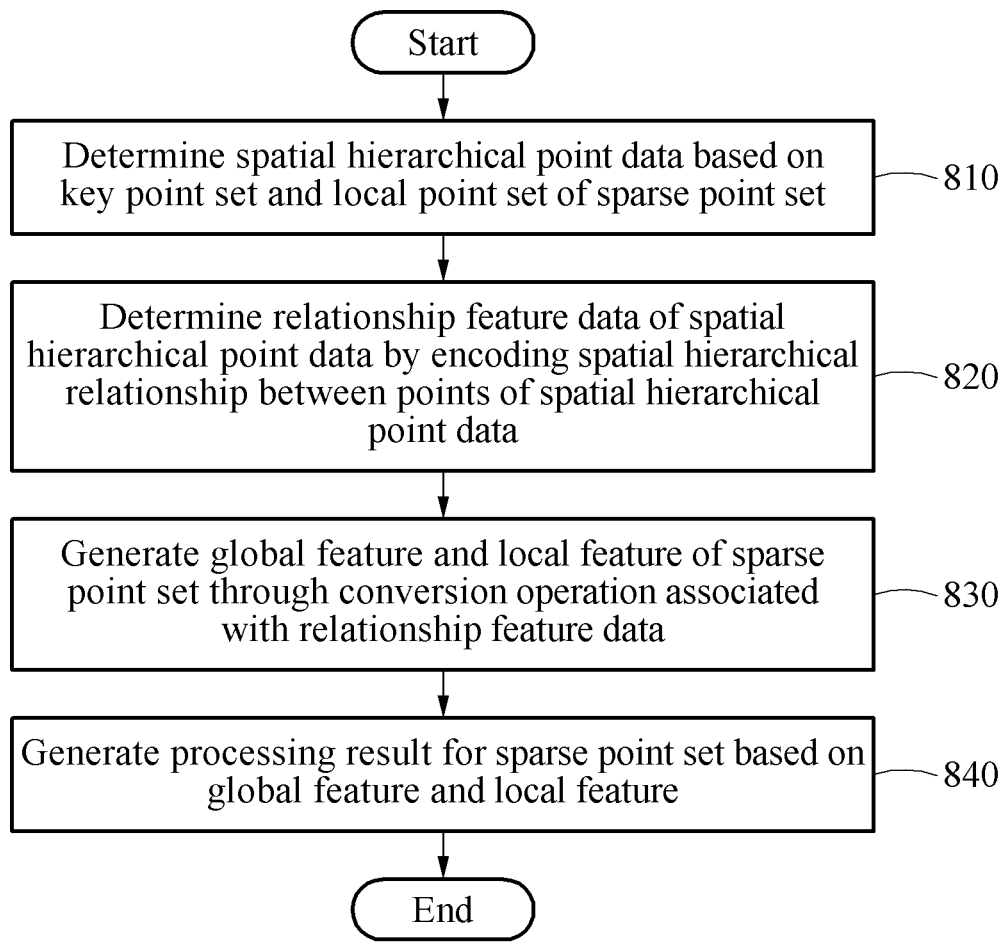
FIG. 8 illustrates an example of a method of processing sparse points.

FIG. 8 illustrates an example of a method of processing sparse points. Referring to FIG. 8, in operation 810, a sparse point processing apparatus determines spatial hierarchical point data based on a key point set and a local point set of a sparse point set. The sparse point processing apparatus may determine the key point set by sampling key points in the sparse point set, and may determine the local point set by grouping local points around each of the key points. In operation 820, the sparse point processing apparatus determines relationship feature data of the spatial hierarchical point data by encoding a spatial hierarchical relationship between points of the spatial hierarchical point data. The sparse point processing apparatus may determine a spatial hierarchical relationship representation of the spatial hierarchical point data and may determine the relationship feature data by applying the spatial hierarchical relationship representation to the spatial hierarchical point data.

In operation 830, the sparse point processing apparatus generates a global feature and a local feature of the sparse point set through a conversion operation associated with the relationship feature data. The sparse point processing apparatus may generate the global feature through a max pooling operation based on the relationship feature data, and may generate the local feature through a concatenation operation based on the relationship feature data. In operation 840, the sparse point processing apparatus generates a processing result for the sparse point set based on the global feature and the local feature. The processing result may include, for example, any one or any combination of a pose estimation result of a target and identification information of each point. In addition, the description provided with reference to FIGS. 1 through 7 above and FIGS. 9 and 10 below is also applicable to the method of FIG. 8.

Figure 9:
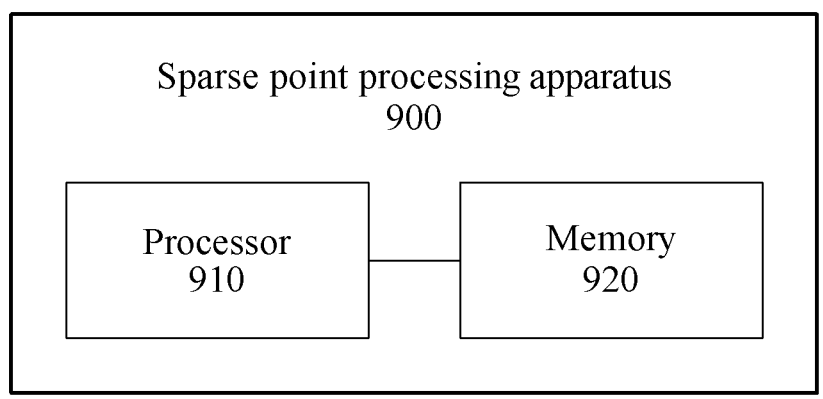
FIG. 9 illustrates an example of a configuration of an apparatus for processing sparse points.

FIG. 9 illustrates an example of a configuration of a sparse point processing apparatus 900. Referring to FIG. 9, the sparse point processing apparatus 900 includes a processor 910 and a memory 920. The memory 920 may be connected to the processor 910, and may store instructions executable by the processor 910, data to be computed by the processor 910, or data processed by the processor 910. The memory 920 may include, for example, a non-transitory computer-readable storage medium, for example, a high-speed random access memory (RAM) and/or a non-volatile computer-readable storage medium (for example, at least one disk storage device, a flash memory device, or other non-volatile solid state memory devices).

The processor 910 may execute instructions to perform the operations described above with reference to FIGS. 1 through 8 above and FIG. 10 below. For example, the processor 910 may determine spatial hierarchical point data based on a key point set and a local point set of a sparse point set, may determine relationship feature data of the spatial hierarchical point data by encoding a spatial hierarchical relationship between points of the spatial hierarchical point data, may generate a global feature and a local feature of the sparse point set through a conversion operation associated with the relationship feature data, and may generate a processing result for the sparse point set based on the global feature and the local feature. In addition, the description of FIGS. 1 through 8 and 10 is also applicable to the sparse point processing apparatus 900.

Figure 10:
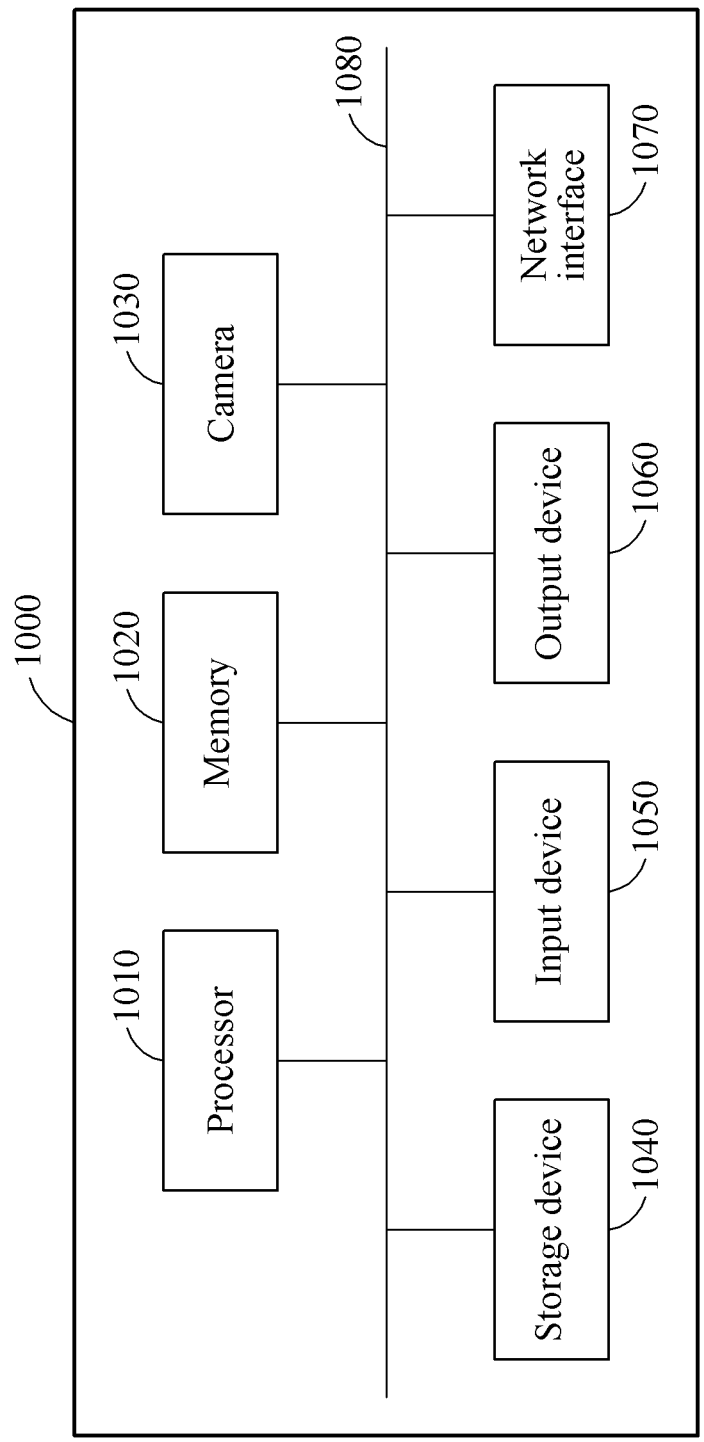
FIG. 10 illustrates an example of a configuration of an electronic apparatus.

FIG. 10 illustrates an example of a configuration of an electronic apparatus 1000. Referring to FIG. 10, the electronic apparatus 1000 includes a processor 1010, a memory 1020, a camera 1030, a storage device 1040, an input device 1050, an output device 1060, and a network interface 1070. The processor 1010, the memory 1020, the camera 1030, the storage device 1040, the input device 1050, the output device 1060, and the network interface 1070 may communicate with each other via a communication bus 1080. For example, the electronic apparatus 1000 may be implemented as at least a portion of, for example, a mobile device such as a mobile phone, a smartphone, a personal digital assistant (PDA), a netbook, a tablet computer or a laptop computer, a wearable device such as a smartwatch, a smart band or smart glasses, a computing device such as a desktop or a server, home appliances such as a television (TV), a smart TV or a refrigerator, a security device such as a door lock, a vehicle such as a smart vehicle, a virtual reality (VR) device, or an augmented reality (AR) device.

The electronic apparatus 1000 may obtain a sparse point set, may generate a processing result for the sparse point set, and may perform operations related to the processing result. The electronic apparatus 1000 may structurally and/or functionally include the sparse point processing apparatus 100 of FIG. 1 and the sparse point processing apparatus 900 of FIG. 9. The processor 1010 may execute instructions and functions in the electronic apparatus 1000. For example, the processor 1010 may process instructions stored in the memory 1020 or the storage device 1040. The processor 1010 may perform at least one of the operations described above with reference to FIGS. 1 through 9. The memory 1020 may include a non-transitory computer-readable storage medium or a non-transitory computer-readable storage device. The memory 1020 may store instructions that are to be executed by the processor 1010, and also store information associated with software and/or applications when the software and/or applications are being executed by the electronic apparatus 1000.

The camera 1030 may capture a photo and/or a video. For example, the camera 1030 may be a DVS configured to generate an event stream associated with a sparse point set based on a change in sensed visual information. The storage device 1040 may include a non-transitory computer-readable storage medium or a non-transitory computer-readable storage device. The storage device 1040 may store a greater amount of information than that of the memory 1020 for a relatively long period of time. For example, the storage device 1040 may include magnetic hard disks, optical disks, flash memories, floppy disks, or other forms of non-volatile memories known in the art.

The input device 1050 may receive an input from a user through a traditional input scheme using a keyboard and a mouse, and through a new input scheme such as a touch input, a voice input and an image input. The input device 1050 may include, for example, a keyboard, a mouse, a touch screen, a microphone, or other devices configured to detect an input from a user and transmit the detected input to the electronic apparatus 1000. The output device 1060 may provide a user with an output of the electronic apparatus 1000 through a visual channel, an auditory channel, or a tactile channel. The output device 1060 may include, for example, a display, a touchscreen, a speaker, a vibration generator, or any other device configured to provide a user with the output. The network interface 1070 may communicate with an external device via a wired or wireless network.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A method of processing sparse points, the method comprising:
   determining spatial hierarchical point data based on a key point set and a local point set of a sparse point set;
   determining relationship feature data of the spatial hierarchical point data by encoding a spatial hierarchical relationship between points of the spatial hierarchical point data;
   generating a global feature and a local feature of the sparse point set through a conversion operation associated with the relationship feature data; and
   generating a processing result for the sparse point set based on the global feature and the local feature,
   wherein the determining of the relationship feature data comprises:
   determining a spatial hierarchical relationship representation of the spatial hierarchical point data; and
   determining the relationship feature data by applying the spatial hierarchical relationship representation to the spatial hierarchical point data,
   wherein the determining of the spatial hierarchical relationship representation comprises:
   transforming the spatial hierarchical point data through different convolutional layers to generate first operation results corresponding to different versions of the spatial hierarchical point data;
   transforming the first operation results through different transpose operations to generate second operation results corresponding to different versions of the spatial hierarchical point data;
   determining first intermediate data and second intermediate data by fusing operation results from the first operation results and the second operation results; and
   determining the spatial hierarchical relationship representation by combining the first intermediate data and second intermediate data.

2. The method of claim 1, wherein the determining of the spatial hierarchical point data comprises:
   determining the key point set by sampling key points in the sparse point set; and
   determining the local point set by grouping local points around each of the key points.

3. The method of claim 1, wherein the generating of the global feature and the local feature comprises:
   generating the global feature through a max pooling operation based on the relationship feature data; and
   generating the local feature through a concatenation operation based on the relationship feature data.

4. The method of claim 1, further comprising generating the sparse point set based on a change in visual information sensed by a dynamic vision sensor (DVS).

5. The method of claim 1, wherein the processing result comprises a pose estimation result of a target corresponding to the sparse point set.

6. The method of claim 5, wherein the pose estimation result indicates a pose of the target by six degrees of freedom (6DOF).

7. The method of claim 1, wherein the processing result comprises identification information of each point of the sparse point set.

8. The method of claim 1, wherein the sparse point set is a sparse two-dimensional (2D) point set that is free of texture, contour and color.

9. A non-transitory computer-readable storage medium storing instructions that, when executed by a processor, cause the processor to perform the method of claim 1.

10. An apparatus for processing sparse points, the apparatus comprising:
a processor; and
a memory comprising instructions executable by the processor,
wherein in response to the instructions being executed by the processor, the processor is configured to:
determine spatial hierarchical point data based on a key point set and a local point set of a sparse point set;
determine relationship feature data of the spatial hierarchical point data by encoding a spatial hierarchical relationship between points of the spatial hierarchical point data;
generate a global feature and a local feature of the sparse point set through a conversion operation associated with the relationship feature data; and
generate a processing result for the sparse point set based on the global feature and the local feature,
wherein, in the determining of the relationship feature data, the processor is configured to:
determine a spatial hierarchical relationship representation of the spatial hierarchical point data; and
determine the relationship feature data by applying the spatial hierarchical relationship representation to the spatial hierarchical point data,
wherein, in the determining of the spatial hierarchical relationship representation, the processor is configured to:
transform the spatial hierarchical point data through different convolutional layers to generate first operation results corresponding to different versions of the spatial hierarchical point data;
transform the first operation results through different transpose operations to generate second operation results corresponding to different versions of the spatial hierarchical point data;
determine first intermediate data and second intermediate data by fusing operation results from the first operation results and the second operation results; and
determine the spatial hierarchical relationship representation by combining the first intermediate data and second intermediate data.

11. The apparatus of claim 10, wherein the sparse point set is generated based on a change in visual information sensed by a dynamic vision sensor (DVS).

12. The apparatus of claim 10, wherein the processing result comprises at least one of a pose estimation result of a target corresponding to the sparse point set and identification information of each point of the sparse point set.

13. An electronic apparatus comprising:
a dynamic vision sensor (DVS) configured to generate an event stream for a sparse point set based on a change in sensed visual information; and
a processor configured to:
determine spatial hierarchical point data based on a key point set and a local point set of the sparse point set;
determine relationship feature data of the spatial hierarchical point data by encoding a spatial hierarchical relationship between points of the spatial hierarchical point data;
generate a global feature and a local feature of the sparse point set through a conversion operation associated with the relationship feature data; and
generate a processing result for the sparse point set based on the global feature and the local feature,
wherein, in the determining of the relationship feature data, the processor is configured to:
determine a spatial hierarchical relationship representation of the spatial hierarchical point data; and
determine the relationship feature data by applying the spatial hierarchical relationship representation to the spatial hierarchical point data,
wherein, in the determining of the spatial hierarchical relationship representation, the processor is configured to:
transform the spatial hierarchical point data through different convolutional layers to generate first operation results corresponding to different versions of the spatial hierarchical point data;
transform the first operation results through different transpose operations to generate second operation results corresponding to different versions of the spatial hierarchical point data;
determine first intermediate data and second intermediate data by fusing operation results from the first operation results and the second operation results; and
determine the spatial hierarchical relationship representation by combining the first intermediate data and second intermediate data.

14. The electronic apparatus of claim 13, wherein the processing result comprises at least one of a pose estimation result of a target corresponding to the sparse point set and identification information of each point of the sparse point set.

* * * * *